United States Patent
Rosenberg et al.

(10) Patent No.: US 9,715,702 B2
(45) Date of Patent: Jul. 25, 2017

(54) SYSTEM AND METHOD FOR DETERMINING RETAIL-BUSINESS-RULE COEFFICIENTS FROM CURRENT PRICES

(71) Applicant: Clear Demand, Inc., Scottsdale, AZ (US)

(72) Inventors: Adam N. Rosenberg, Scottsdale, AZ (US); James A. Sills, Scottsdale, AZ (US)

(73) Assignee: Clear Demand, Inc., Scottsdale, AZ (US)

( * ) Notice: Subject to any disclaimer, the term of this patent is extended or adjusted under 35 U.S.C. 154(b) by 574 days.

(21) Appl. No.: 14/219,795

(22) Filed: Mar. 19, 2014

(65) Prior Publication Data

US 2014/0289167 A1    Sep. 25, 2014

Related U.S. Application Data

(60) Provisional application No. 61/852,656, filed on Mar. 19, 2013.

(51) Int. Cl.
*G06Q 30/02* (2012.01)
(52) U.S. Cl.
CPC .............. *G06Q 30/0283* (2013.01)

(58) Field of Classification Search
CPC .................................. G06Q 30/0283
USPC ................... 235/376, 378; 705/400
See application file for complete search history.

(56) References Cited

U.S. PATENT DOCUMENTS

| | | | |
|---|---|---|---|
| 7,996,331 B1 * | 8/2011 | Solanki | G06Q 10/04 705/1.1 |
| 2012/0130726 A1 * | 5/2012 | Subramanian | G06F 17/11 705/1.1 |

* cited by examiner

*Primary Examiner* — Toan Ly
(74) *Attorney, Agent, or Firm* — Polsinelli P.C.

(57) ABSTRACT

Business rules can govern a single price or they can define relationships between different products involving two or more decision prices. One problem that retailers can face is that business rules are generally not codified and are rarely followed consistently, and thus it can be difficult to articulate existing business rules or generate new business rules. However, existing price information inherently contains industry knowledge and experience, even if retailers find it difficult to express that knowledge. The disclosed technology generates business rules by reverse engineering rule bounds and coefficients from existing price information. The reverse engineered rule bounds and coefficients can be used in price optimization to generate recommended prices for retail products that optimize revenue and profit while complying with a set of business rules.

20 Claims, 5 Drawing Sheets

SYSTEM AND METHOD FOR DETERMINING RETAIL-BUSINESS-RULE COEFFICIENTS FROM CURRENT PRICES

CROSS REFERENCE TO RELATED APPLICATIONS

This application claims the benefit of U.S. Provisional Patent Application 61/852,656, entitled "SYSTEM AND METHOD FOR DETERMINING RETAIL-BUSINESS-RULE COEFFICIENTS FROM CURRENT PRICES", filed Mar. 19, 2013, and which is hereby expressly incorporated herein by reference in its entirety.

FIELD OF INVENTION

The present disclosure relates to generating recommended prices, and more specifically pertains to generating business rules for price optimization, and more specifically pertains to reverse engineering business rules from existing prices.

BACKGROUND

There has been a steady evolution in retail science towards solutions with more sensitivity to business reality. Early mathematical solutions in price optimization made retailers more revenue and profit but often generated solutions that failed to take into consideration business rules. For example, in most retail settings the double-sized box should be more than the single-size box, but not quite twice as much. Some newer price optimization techniques involve performing business rule compliance, but compliance can only occur for known business rules. Unfortunately, one problem that retailers can face is that business rules are generally not codified and are rarely followed consistently, and thus it can be difficult to articulate existing business rules or generate new business rules.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for generating business rules. Using model parameters and other inputs, prices can be optimized within each product network to maximize revenue, profit, or a combination of revenue and profit. The result is a set of recommended prices in which one or more products can be assigned a price different than an original price of the product. Such an approach can produce an ideal set of prices that maximize revenue and/or profit while complying with a set of business rules.

The business rules can govern a single price, such as minimum or maximum price change, margin, locked prices, competitive prices, ending numbers, and multiples. The business rules can also define relationships between different products and therefore involve two or more decision prices, such as size, brand, product line, and promotion. One problem that retailers can face is that business rules are generally not codified and are rarely followed consistently, and thus it can be difficult to articulate existing business rules or generate new business rules. However, existing price information inherently contains industry knowledge and experience, even if retailers find it difficult to express that knowledge. The presently disclosed technique for generating business rules can leverage this fact to address the difficulty of articulating business rules by reverse engineering business rule bounds and coefficients from existing price information.

The presently disclosed business rule reverse engineering technique is particularly useful for two categories of business rules: bounded rules and comparative rules. The first category of business rules, bounded business rules, provide constraints on a single decision price. The constraints can be one-sided (i.e., a lower bound or an upper bound) or two-sided (i.e., upper and lower bounds). There are three special cases of bounded business rules: competitive, margin, and step size, while other bounded rules are general cases of price range and target price. The second category of business rules, comparative business rules, provide constraints connecting two decision prices within a product network. There are three categories of comparative business rules: measured, named, and Boolean.

In general, the present business rule reverse engineering technique generates price bounds for bounded business rules and rule parameters for comparative business rules based on existing price information for a set of products. The price bounds can include an upper bound value, a lower bound value, and target value, where the calculation performed to determine the bounds depends on the type of bounded business rule. Likewise, the calculation performed to determine the rule parameters depends on the type of comparative business rule. After generating the price bounds and the rule parameters, the generated price bounds and/or rule parameters can be used as an input to a price generation method to generate recommended prices.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for a technique for automatically generating business rules for use in price optimization. Using the present technology it is possible to reverse engineer business rules for use in price optimization from existing retail price information including prices set by retail managers, costs, competitive prices, reference prices, and product attributes. The disclosure first sets forth a discussion of a basic general purpose system or computing device in FIGS. 1A and 1B that can be employed to practice the concepts disclosed herein before turning to a discussion of relevant terms and a more detailed description of the improved technique for generating recommended prices.

Figure 1A:
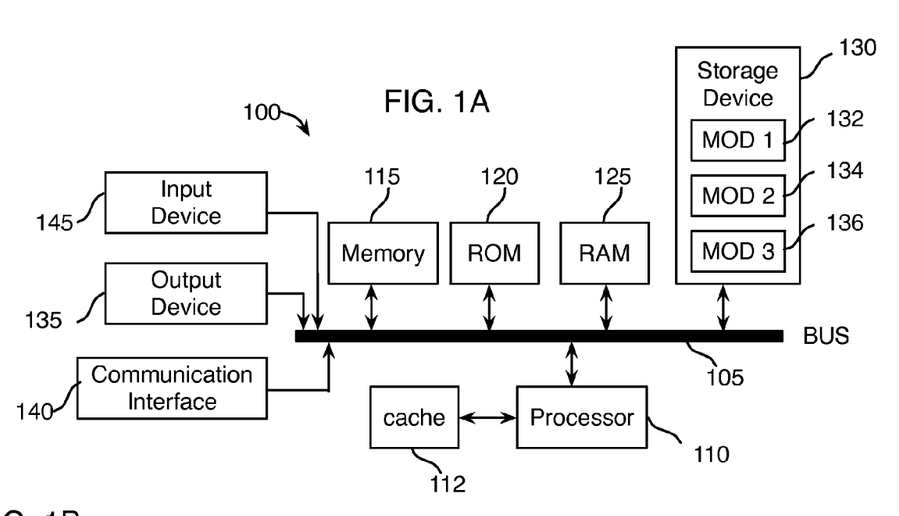
FIGS. 1A and 1B illustrate exemplary system embodiments.
Figure 1B:
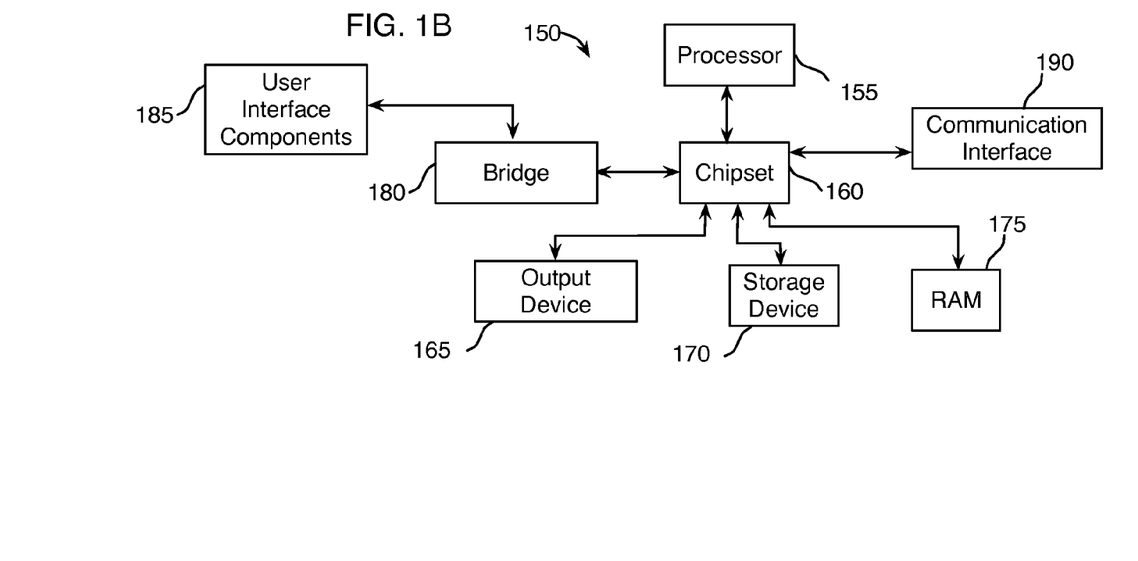

FIG. 1A and FIG. 1B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 1A illustrates a conventional system bus computing system architecture 100 wherein the components of the system are in electrical communication with each other using a bus 105. Exemplary system 100 includes a processing unit (CPU or processor) 110 and a system bus 105 that couples various system components including the system memory 115, such as read only memory (ROM) 120 and random access memory (RAM) 125, to the processor 110. The system 100 can include a cache of high-speed memory connected directly with, in close proximity to, or integrated as part of the processor 110. The system 100 can copy data from the memory 115 and/or the storage device 130 to the cache 112 for quick access by the processor 110. In this way, the cache can provide a performance boost that avoids processor 110 delays while waiting for data. These and other modules can control or be configured to control the processor 110 to perform various actions. Other system memory 115 may be available for use as well. The memory 115 can include multiple different types of memory with different performance characteristics. The processor 110 can include any general purpose processor and a hardware module or software module, such as module 1 132, module 2 134, and module 3 136 stored in storage device 130, configured to control the processor 110 as well as a special-purpose processor where software instructions are incorporated into the actual processor design. The processor 110 may essentially be a completely self-contained computing system, containing multiple cores or processors, a bus, memory controller, cache, etc. A multi-core processor may be symmetric or asymmetric.

To enable user interaction with the computing device 100, an input device 145 can represent any number of input mechanisms, such as a microphone for speech, a touch-sensitive screen for gesture or graphical input, keyboard, mouse, motion input, speech and so forth. An output device 135 can also be one or more of a number of output mechanisms known to those of skill in the art. In some instances, multimodal systems can enable a user to provide multiple types of input to communicate with the computing device 100. The communications interface 140 can generally govern and manage the user input and system output. There is no restriction on operating on any particular hardware arrangement and therefore the basic features here may easily be substituted for improved hardware or firmware arrangements as they are developed.

Storage device 130 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 125, read only memory (ROM) 120, and hybrids thereof.

The storage device 130 can include software modules 132, 134, 136 for controlling the processor 110. Other hardware or software modules are contemplated. The storage device 130 can be connected to the system bus 105. In one aspect, a hardware module that performs a particular function can include the software component stored in a computer-readable medium in connection with the necessary hardware components, such as the processor 110, bus 105, display 135, and so forth, to carry out the function.

FIG. 1B illustrates a computer system 150 having a chipset architecture that can be used in executing the described method and generating and displaying a graphical user interface (GUI). Computer system 150 is an example of computer hardware, software, and firmware that can be used to implement the disclosed technology. System 150 can include a processor 155, representative of any number of physically and/or logically distinct resources capable of executing software, firmware, and hardware configured to perform identified computations. Processor 155 can communicate with a chipset 160 that can control input to and output from processor 155. In this example, chipset 160 outputs information to output 165, such as a display, and can read and write information to storage device 170, which can include magnetic media, and solid state media, for example. Chipset 160 can also read data from and write data to RAM 175. A bridge 180 for interfacing with a variety of user interface components 185 can be provided for interfacing with chipset 160. Such user interface components 185 can include a keyboard, a microphone, touch detection and processing circuitry, a pointing device, such as a mouse, and so on. In general, inputs to system 150 can come from any of a variety of sources, machine generated and/or human generated.

Chipset 160 can also interface with one or more communication interfaces 190 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 155 analyzing data stored in storage 170 or 175. Further, the machine can receive inputs from a user via user interface components 185 and execute appropriate functions, such as browsing functions by interpreting these inputs using processor 155.

It can be appreciated that exemplary systems 100 and 150 can have more than one processor 110 or be part of a group or cluster of computing devices networked together to provide greater processing capability.

Having disclosed some components of a computing system, the disclosure now turns to a brief description of terms relevant to retail science.

Product: distinct products are items on retail shelves or online perceived as different by shoppers. The products can be grouped into different types of groupings. The process of identifying price families and product networks is called product linking.

Price Families: products can be grouped into price families. Each price family can have products that share similar shopper response to price change and require identical prices. For example, six-ounce (6 oz.) containers of Dannon™ Yogurt in various flavors, such as, plain, vanilla, strawberry and strawberry-banana, would be in one price family since they share similar shopper demand and are priced the same.

Product Networks: price families can be grouped into product networks. Each product network can have price families that are linked together by at least one comparative business rule. For, example, Coke™ products of different sizes, Pepsi™ products of different sizes, and store-brand soda products of different sizes can be linked together by one or more comparative rules. For example, a twelve-ounce (12 oz.) can of Coke™ and a twelve-ounce (12 oz.) can of Pepsi™ may be the same price and each may be twenty percent (20%) more expensive than a twelve-ounce (12 oz.) can of the store brand cola soda. Similarly, a sixteen-ounce (16 oz.) container of Coke™ may be ten percent (10%) more expensive than a twelve-ounce (12 oz.) can of Coke™. In another example, a sixteen-ounce (16 oz.) container of Pepsi™ may be thirty percent (30%) more expensive than a twelve ounce (12 oz.) of the store brand cola soda.

Store Grouping: stores are different places to shop. An online retail environment can be considered to be one store. The process of identifying markets, zones, locations, and areas is called store linking. Markets can be a collection of stores with common shoppers, typically defined geographically, but can be defined demographically. Zones can be collections of markets defined by retailers for one or more reasons. Locations can be collections of one or more stores defined by the granularity of available sales data. Areas can be collections of one or more locations defined by the granularity of price decisions. While retail-science can have areas as disjoint collections of locations, an area for a product can be different for two different promotions. For example, a first soda retailer can have city-by-city pricing for their sodas and a second soda retailer can have statewide pricing.

Customer Types: communities of shoppers identified in a pricing environment. For example, a product might be offered at a discount for a group of people, such as club members, people over a specific age and students.

Sales Types: can be different types of selling promotions which can include no promotions, signage, products at the end of an aisle ("endcaps"), discount and buy some, get some free.

Decision Prices: individual price decisions can be based on price family, area, customer type and sales type.

Decision Price Sets: decision prices can be grouped into decision price sets based on one or more comparative business rules, such as size or brand.

Bounded Business Rules: can be ranges imposed on individual decision prices. Examples can include competitive prices (price of a product based on competitor's price), margin requirements (no less than cost plus a set percentage of the price), price-change amounts (no change more than a set percentage or amount or no change less than a set percentage or amount) and locked decision price (price cannot change from its current price). Retailers can also have bounded business rules with lower bounds based on competition and upper bounds based on margin.

Comparative Business Rules: can be relationships between two decision prices. For example, a size rule where the price for one product having a first size can have a fixed rate higher than the same product having a second size, such as a twenty ounce (20 oz.) bag of chips can cost 1.6 times higher than a ten ounce (10 oz.) bag of chips. In another example, a brand rule where one brand of a product can have a fixed rate higher than a second brand of the same product, such as the price for a national brand soda can be 1.3 times higher than a store brand soda can. Decision prices can be bounded by two comparative business rules, such as brand and size.

Maximum Price Change: price changes for a product can only be changed by a certain percentage or amount from the current price, such as the manufactured recommended price.

Minimum Price Change: price changes for a product can only be changed by a certain percentage or amount from the current price, such as the manufactured recommended price.

Margin: the price for a product required to earn a minimum margin. Margin can be profit divided by revenue or price minus cost divided by price.

Locked Price: a price that cannot be changed.

Competitive Pricing: a price of a same or similar product offered by another retailer can be a factor in setting a price for the product. For example, a retailer may require a price of a product be lower than a same product sold by a competing retailer. In another example, a retailer may require a price of a product be within a percentage of the price offered by a competing retailer, e.g. five percent lower so that the price is lower, but not too low.

Size: two products that are the same, but different sizes, can have a price relationship. Typically, the larger sized product is more expensive than the smaller sized product, but is less expensive on a unit basis. For example, a twenty ounce (20 oz.) container for a first product would have a fixed price relationship with a ten ounce (10 oz.) container for the first product, such as 1.5 or 1.8 times more expensive.

Brand: two products that are similar but different brands can have a price relationship. Typically, one brand is considered superior to the other and there is a range of price ratios based on shopper perception. For example, a brand name cereal would be between 1.3 and 1.6 times as expensive as the store-brand version. When different brand products are different sizes, the constraint can be considered a brand constraint and the ratios combine in the least-restrictive way. For example, a twenty ounce (20 oz.) box a name brand cereal should be between (1.3×1.5) and (1.8×1.6) as expensive as a ten ounce (10 oz.) box of the store-brand version.

Product Line: two products that are the same brand, but different in another way, can have a price relationship. Typically, the same company or brand can offer different products under the same name/brand with a fixed price relationship. For example, a dairy company can offer a twenty ounce (20 oz.) container of ice cream to have a fixed price relationship with a twenty ounce (20 oz.) container of frozen yogurt, such as 1.2 or 1.3 times more expensive.

Cannibalization (Substitution): occurs when the sales of a first product detract from the sales of a second product. For example, when Coke™ goes on sale, its increased sales decrease the sales of Pepsi™.

Affinity (Halo Affect): occurs when the sales of one product enhance the sales of another product. For example, when the sales of hot dogs lead to increased sales of buns, relish, charcoal, etc.

Promotion: products on sale, or offered to specific customer groups, must be offered at a lower price compared to the recommended price. For example, the lower price can be for ten percent (10%) off or buy one get one free (BOGO).

Ending Numbers: product prices can be required to end in appropriate values. Typically, prices end with a nine (9) as the last digit in the price, such as "79" or "99." In one or more cases, the last two digits of the price can indicate the status of the product. For example, a product that ends in "99" can be for products that are always sold by the store, a product that ends in "89" can be for products that are seasonal, and a product that ends in "79" can be for products that will no longer be carried once they are sold out.

Multiples: products that come in multiples can have different pricing rules than single-item prices that end with a "9" for the last digit for the price. For example, when multiples of a product are offered, the price can end with two zeros ("00"), such as three (3) for three dollars ($3.00) or five (5) for five dollars ($5.00).

Number of Price Changes: a global rule for an assignment of decision prices may involve a limit on the number or percentage of prices that can change. For example, no more than twenty percent (20%) of the prices can change from current to recommended prices.

Global Margin: a global rule for the entire collection of decision prices can be expected global margin, which is that total profit (price minus cost) divided by total price should be above a specified value.

Revenue-Profit Weight: defines a business preference for profit over revenue. A value of zero for the revenue-profit weight means a retailer is aiming for maximum revenue in price assignment. A value of one for the revenue-profit weight means a retailer is aiming for maximum profit in price assignment. A value w between the zero and one means a retailer is aiming to maximize $(1-w)R+wP$, where R is revenue and P is profit.

Sales History Data: each entry in the sales history can specify a product or price family, a location, a customer type, a sales type, a time period, and/or numerical data such as price, costs, and/or units sold. Time periods can typically be in weeks with date ranges. Due to the nature of point of sales (POS) systems, the sales history typically does not contain zero sales information. It only contains data when a positive quantity is sold. Sales history can be for one or more groupings of products, all products offered for sale, or a subset of the products offered for sale. Sales history can cover one or more locations, all locations, or a subset of locations selling the products. Time periods can be coincident, overlapping, or non-overlapping for different groupings of products and locations.

Having defined a glossary of relevant terms, the disclosure now turns to a brief introductory description of using retail price optimization to generate recommended prices for retail products. In retail price optimization, a system can use demand modeling to analyze sales history data to generate a demand model, or demand-model parameters, of consumer demand for products. The system can then use the model to compute prices that maximize revenue, profit, or a combination of revenue and profit.

Figure 2:
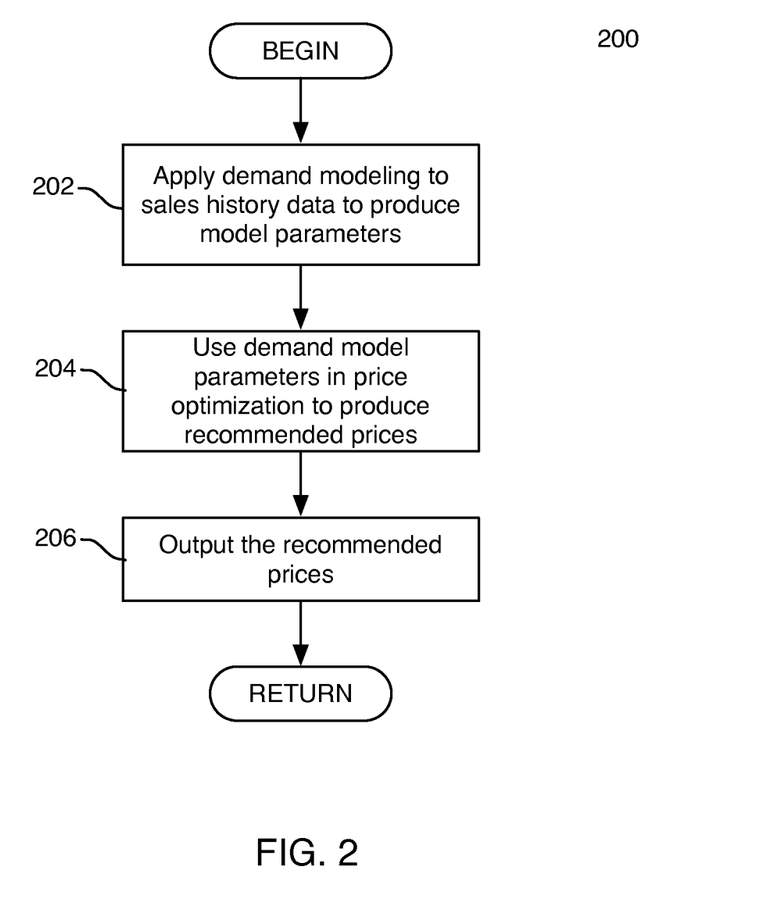
FIG. 2 illustrates an exemplary method embodiment for retail price optimization.

FIG. 2 is a flowchart illustrating an exemplary retail price optimization method 200. For the sake of clarity, this method is discussed in terms of an exemplary computing system, such as is shown in FIGS. 1A and 1B. Although specific steps are shown in FIG. 2, in other embodiments a method can have more or less steps than shown.

The retail price optimization begins when the computing system applies demand modeling to sales history data to produce model parameters (202), which can be used in a variety of retail-science analyses, including forecasting sales, price optimization, markdown, assortment planning, inventory replenishment, promotion planning, etc. In some embodiments, the predictions can be by product, store, time, and promotion status. The sales data can specify a variety of information about one or more products over a sequence of time periods. For example, the sales data can specify the number of sales per week over a two year time period.

The demand model can be a publicly known demand model or a proprietary demand model. The model parameters can include economic demand elasticity and baseline sales. The model parameters can also include factors for seasonality and/or for specific local, such as regional and national events and holidays. In one or more embodiments, one or more demand models can have separate parameters to account for promotional or sales events. The sales data can be for a common duration, such as two months or two years.

After applying demand modeling to sales data to produce demand-model parameters (or a demand model), the computing system can use the demand-model parameters in price generation to produce recommended prices (204). The recommended prices can be for the decision prices corresponding to the sales history data. In some embodiments, the price generation can be applied based on the model parameters and other inputs. In some cases, price generation can include price optimization. The other inputs can include one or more of current prices, bounded business rules, and/or comparative business rules. The recommended prices can be a single list of prices or list of prices for one or more revenue-profit weights. As a result, the recommended prices can indicate revenue-profit goals, ending-number price compliance, common prices for price families, compliance with bounded business rules, compliance with comparative business rules, global margin requirements, and/or price-change requirements. In one or more embodiments, the computing system can forecast unit sales from current prices and recommended prices using the demand-model parameters. The computing system can also use the demand-model parameters for markdown analysis, assortment planning, inventory replenishment, promotion planning, etc.

After using the model parameters and other inputs in price generation to produce recommended prices, the computing system can output the recommended prices (206). In some embodiments, the computing system can output the forecast unit sales from current prices and recommended prices. The output can be in one or more forms, including, but not limited to, rendering the recommended prices on a display and/or storing in one or more databases communicatively coupled to a processor of the computing system. The recommended prices can be one set of decision-price recommendations or represent several revenue-profit weights.

As described above, price generation is a key step in the process of generating recommended prices. Using model parameters and other inputs, prices can be optimized within each product network to maximize revenue, profit, or a combination of revenue and profit. The result is a set of recommended prices in which one or more products can be assigned a price different than an original price of the product. Such an approach can produce an ideal set of prices that maximize revenue and/or profit while complying with a set of business rules.

The business rules can govern a single price, such as minimum or maximum price change, margin, locked prices, competitive prices, ending numbers, and multiples. The business rules can also define relationships between different products and therefore involve two or more decision prices, such as size, brand, product line, and promotion. One problem that retailers can face is that business rules are generally not codified and are rarely followed consistently, and thus it can be difficult to articulate existing business rules or generate new business rules. Additionally, in some cases, a retailer may believe that they know what rules they are following when pricing products. For example, the retailer may believe that they are using a rule with a competitor index of 1.0 and private label to national brand ratio of thirty percent (30%). However, in reality the competitor index is 1.1, meaning they are ten percent (10%) higher than the competition, and the private label to national brand ratio is twenty percent (20%). When the retailer provides a rule based on their perceived pricing strategy to a price generation system, the system recommends many drastic price changes. This can cause significant alarm and the retailer may discontinue use of the system due to a perceived instability.

Existing price information inherently contains industry knowledge and experience, even if retailers find it difficult to express that knowledge. The presently disclosed technique for generating business rules can leverage this fact to address the difficulty of articulating accurate business rules by reverse engineering business rule bounds and coefficients from existing price information. Additionally, because the reverse engineered rules are the rules the retailer is actually following rather than what the retailer believes they are doing, a price generation system that incorporates the disclosed business rule reverse engineering technique can generate prices that are more consistent with the rules and educate the retailer about the currently used rules. This can allow the retailer to slowly adjust the rules to the values the retailer strategically desires.

The business rule reverse engineering technique is particularly useful for two categories of business rules: bounded rules and comparative rules. The first category of business rules, bounded business rules, provide constraints on a single decision price. The constraints can be one-sided (i.e., a lower bound or an upper bound) or two-sided (i.e., upper and lower bounds). There are three special cases of bounded business rules: competitive, margin, and step size, while other bounded rules are general cases of price range and target price.

A competitive bounded rule specifies how strictly a retailer's own price should match a competitor's price. In particular, a competitive rule specifies a ratio between the current price and competitive price. A competitive bounded rule provides a range of ratios between current price and competitive price. That is, a competitive bounded rule can specify a lower bound ratio $R_{min}$ and/or an upper bound ratio $R_{max}$ between current price and competitive price. Additionally, a competitive bounded rule can specify a target ratio $R_{target}$ that can be used when the current ratio between current price and competitive price is outside the specified range of ratios ($R_{min}$, $R_{max}$). There can be a different competitive bounded rule for each competitor, or even the same competitor but different geographic or demographic zones and/or different product groupings.

Margin bounded rules specify a required relationship of price P to cost C. As described above in the glossary of relevant terms, margin M is the fraction of price that is profit, so $M=(P-C)/P$. Minimum margin requirements can depend on price, brand, and/or location. For example, the margin requirements can be lower for more expensive products. In some cases, there can also be maximum margin requirements. Each margin bounded rule provides a minimum margin $R_{min}$, and possibly maximum margin $R_{max}$, and a target margin $R_{target}$ that can be used when the current margin exceeds a minimum or maximum margin.

Step size rules specify what percentage price change is permissible. A maximum-change rule specifies a maximum price change permissible. For example, a maximum-change rule may specify that a sixteen-ounce (16 oz.) soda cannot increase in price by more than ten percent (10%). A minimum-change rule specifies a minimum price change permissible. For example, a minimum-change rule may specify that a 1-liter of soda must change more than half a percent (0.5%) or the price must remain unchanged. A step size bounded rule provides a maximum price change ratio $R_{max}$ between recommended price and current price that cannot be exceeded, even when other rules result in greater change, and a minimum price change ratio $R_{min}$ below which the recommended price remains at the current price.

General bounded rules are other bounded rules, such as minimum advertised price and manufacturer's suggested retail price. Such rules have a reference price that can be compared against a current price. A general bounded rule provides a range of ratios around a reference price ($R_{min}$, $R_{max}$) and a target reference price $R_{target}$ that can be used when the current price falls outside the range of ratios ($R_{min}$, $R_{max}$).

The second category of business rules, comparative business rules, provide constraints connecting two decision prices within a product network. There are three categories of comparative business rules: measured, named, and Boolean. Measured rules are based on a quantitative feature of a product, such as size, weight, volume, and/or quantity. Named rules associate value with a non-quantitative feature, such as brand, product line, and/or color. Boolean rules are a special case of measured or named rules where the value is either yes or no. For example, toothpaste with or without fluoride, or floss that is with or without wax.

A measured comparative business rule depends on a physical dimension of two products, such as physical size, item count, diameter, length, thickness, or thread count. For example, a measured comparative business rule can specify an incentive parameter to buy the larger-amount product for each product network.

A named comparative business rule describes a price difference based on a listed, less quantitative feature of a product, such as brand, product line, or differently priced color. For example, a named comparative business rule can specify a parameter for each brand, product line, color, etc. for comparing otherwise-similar products.

Figure 3:
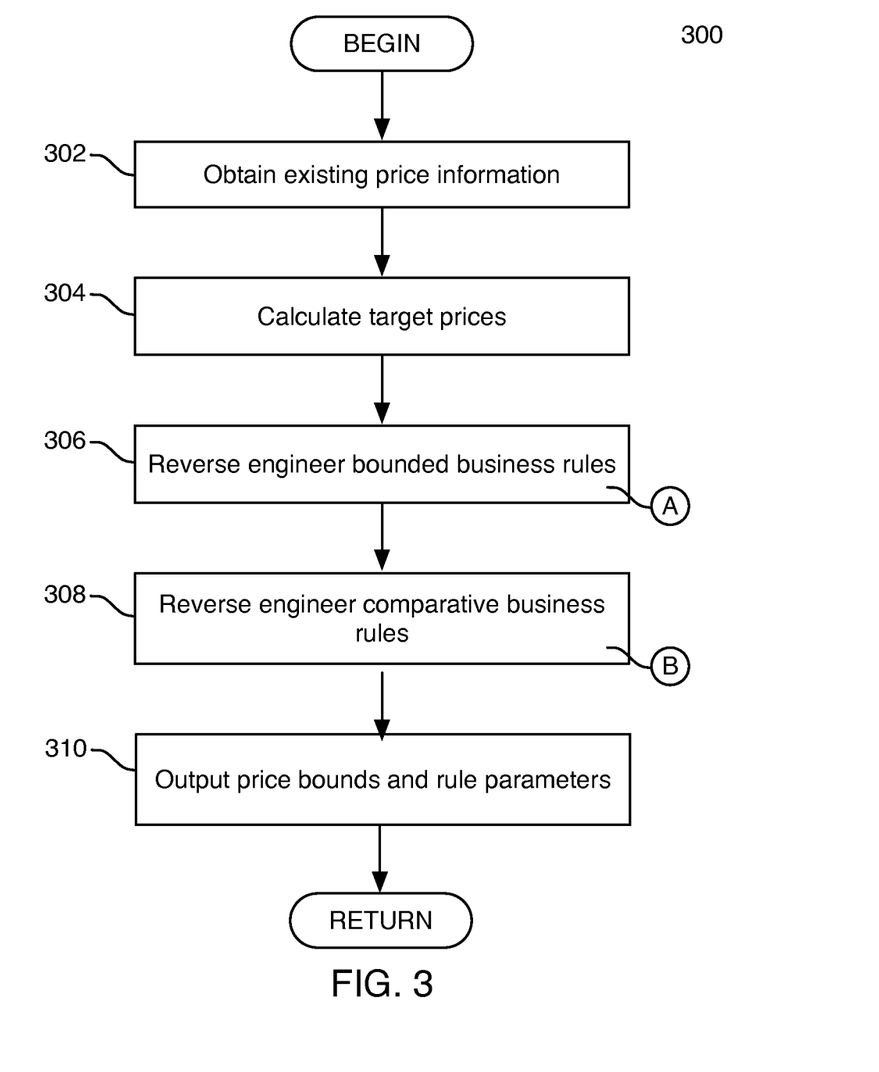
FIG. 3 illustrates an exemplary method embodiment for generating business rules through reverse engineering.

FIG. 3 is a flowchart illustrating an exemplary method 300 for generating business rules through reverse engineering. For the sake of clarity, this method is discussed in terms of an exemplary computing system, such as is shown in FIGS. 1A and 1B. Although specific steps are shown in FIG. 3, in other embodiments a method can have more or less steps.

Method 300 begins when the computing system obtains existing price information for a set of products (302). The existing price information can include product attributes, competitive prices, reference prices, and current costs. Using the existing price information, the computing system can calculate target prices for price point decisions (304). The computing system can then use the calculated target prices as an input for reverse engineering the business rules.

The computing system can first reverse engineer the bounded business rules (306) to generate price bounds for each of the bounded rules. The computing system can reverse engineer the bounded business rules using a variety of techniques, such as the bounded business rules reverse engineering technique in method 400 in FIG. 4, described below. Next the computing system can reverse engineer the comparative business rules (308) to generate rule parameters. The computing system can reverse engineer the comparative business rules using a variety of techniques, such as the comparative business rules reverse engineering technique in method 500 in FIG. 5, described below. After reverse engineering both the bounded and comparative business rules, the computing system can output the price bounds and the rule parameters (310). The output can be in one or more forms, including, but not limited to, rendering the price bounds and/or rule parameters on a display and/or storing the values in one or more databases communicatively coupled to a processor in the computing system. The generated price bounds and rule parameters can be used as an input to a price generation method to generate recommended prices.

Figure 4:
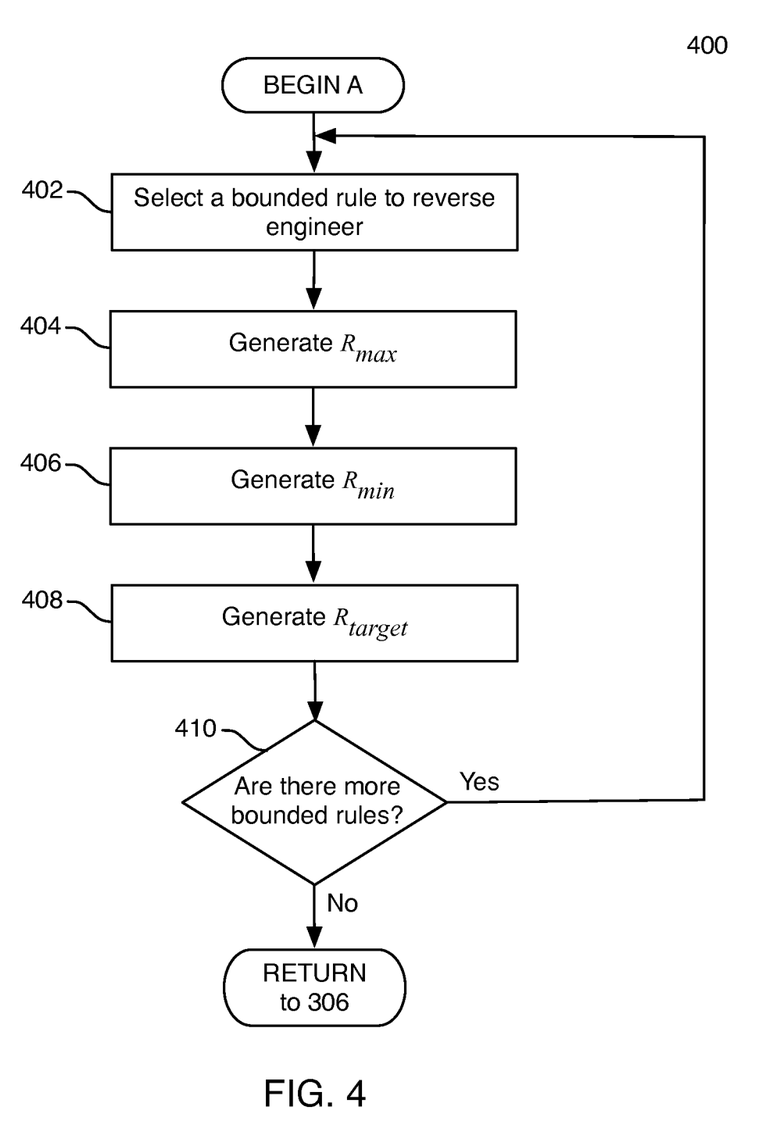
FIG. 4 illustrates an exemplary method embodiment for reverse engineering bounded business rules.

FIG. 4 is a flowchart illustrating an exemplary method 400 for reverse engineering bounded business rules. For the sake of clarity, this method is discussed in terms of an exemplary computing system, such as is shown in FIGS. 1A and 1B. Although specific steps are shown in FIG. 4, in other embodiments a method can have more or less steps.

Method 400 begins when the computing system selects a bounded business rule to reverse engineer (402). Bounded business rules can be reverse engineered individually, one at a time. Each bounded business rule is independent of the others for the purpose of estimating the rules parameters. Therefore, the bounded business rules can be reverse engineered in any order, or even in parallel. The computing system can use current prices and target prices, such as those calculated at step 304 of method 300 in FIG. 3, to reverse engineer a bounded business rule.

After selecting a bounded business rule to reverse engineer, the computing system can generate $R_{max}$ (404), $R_{min}$ (406), and $R_{target}$ (408) for the bounded rule. The method the computing system uses to generate $R_{max}$ and $R_{min}$ depends on the type of bounded rule, i.e., competitive, margin, step size, or general. The methods for generating $R_{max}$ and $R_{min}$ for the different types of bounded rules are described in detail below. The computing system can set $R_{target}$ to the target price calculated at step 304 of method 300 in FIG. 3. After generating $R_{max}$, $R_{min}$, and $R_{target}$, the computing system can check if there are more bounded rules to reverse engineer (410). If so, the computing system can repeat the reverse engineering process by returning to step 410, otherwise the computing system can resume previous processing, which can include resuming processing at step 306 of method 300 in FIG. 3.

To generate $R_{max}$ and $R_{min}$ for competitive bounded rules, each competitive price is labeled with the specific competing retailer, the similarity between the products, and some measure of how close the stores are to each other. For example, two online retailers are considered immediately close to each other, as their "stores" are the Internet. The computing system can then estimate the distribution of price ratios using a statistical model based on these inputs. The statistical model can have internal coefficients for each individual competitor, a coefficient for how similar their product is to the retailer's, and a coefficient for the distance.

For each price affected by competition, the statistical model can produce a ratio between the retailer's price and a reference price in the form of a mean $\mu$ and a standard deviation $\sigma$, where the reference price for a competitive rule can be the competitive price. Then $R_{max}=(\mu+\sigma)(1+f)$, where f is a small factor. Any price above $R_{max}$ can be reset to a target that is the mean-price target $\mu$. Additionally, $R_{min}=(\mu-\sigma)(1-f)$. Any price that is below $R_{min}$ can be reset to the mean-price target $\mu$.

A bonus of the competitive rule reverse engineering is that it can be used to analyze competitor behavior as well. By modeling a competitor's current prices as they are affected by the retailer's prices, it is possible to determine how the competitor is following the retailer. In particular, if the standard deviation $\sigma$ is small, then it can be assumed that the competitor is paying particularly close attention to the retailer's prices.

To generate $R_{max}$ and $R_{min}$ for margin bounded rules, the price variable is expressed as a logarithm log P. The computing system can perform a least-squared-error analysis to determine margin M as a linear function of log P. That is, M=a(log P)+b. The computing system can determine for each product price P a margin mean $\mu$ and standard deviation $\sigma$. Then the computing system can statistically measure and reset any margin that is a small factor f lower than one standard deviation above the mean $v=(\mu-\sigma)(1-f)$ to a target that is the mean $\mu$. So $R_{min}=C/(1-v)$ where P is the price and C is the cost. In some cases, a margin bounded rule can also specify a margin maximum. In this case, margins above $(\mu+\sigma)(1+f)$ can be reset to the mean-margin target $\mu$.

To generate $R_{max}$ for step-size bounded rules, the computing system can find a maximum price change factor C by analyzing the price-change history to identify the $90^{th}$-percentile c of the change ratio. Then the computing system can set the step ranges to C=c+f, where f is a small forgiveness factor. The computing system can reset any percentage price change that is greater than C to c, above or below the current price. Similarly, to generate $R_{min}$ the computing system can find a minimum price change factor B by analyzing the price-change history to identify the $10^{th}$-percentile b of the change ratio. Then the computing system can set the step ranges to B=b-f, where f is a small forgiveness factor. Any percentage price change less than B can be rejected and the recommended price set to the current price.

To generate $R_{max}$ and $R_{min}$ for general bounded rules, the computing system analyzes the statistical distribution of P/R, where P is current prices and R is reference prices, and its mean $\mu$ and standard deviation $\sigma$. So $R_{max}=R(1+\mu+\sigma+f)$ and $R_{min}=R(1+\mu-\sigma-f)$. Any prices above $R_{max}$ and below $R_{min}$ can be reset to the target price $1+\mu$.

Figure 5:
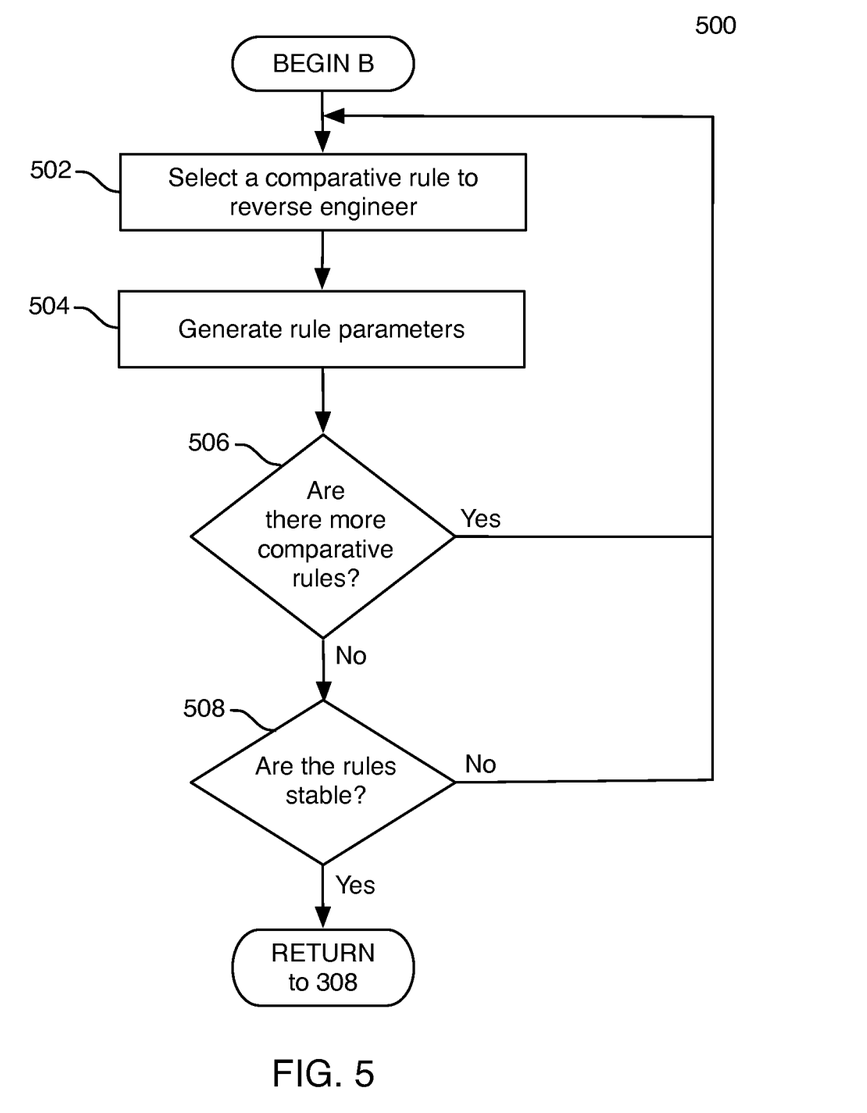
FIG. 5 illustrates an exemplary method embodiment for reverse engineering comparative business rules.

FIG. 5 is a flowchart illustrating an exemplary method 500 for reverse engineering comparative business rules. For the sake of clarity, this method is discussed in terms of an exemplary computing system, such as is shown in FIGS. 1A and 1B. Although specific steps are shown in FIG. 5, in other embodiments a method can have more or less steps.

Method 500 begins when the computing system selects a comparative business rule to reverse engineer (502). When there are many price pairs for the first rules on the list that are not affected by the last rules on the list, comparative business rules can be reverse engineered in order, one at a time. However, if there are many same-brand, same-product-line price pairs with different sizes, then size is a good place to start reverse engineering comparative rules. The computing system can use product attributes and current prices to reverse engineer a comparative business rule.

The computing system can compare two prices in a network for a rule if the prices are the same for all the other rules or if the prices differ only in rules already reverse engineered. Such rules are considered rule-comparable. In some embodiments, reverse engineering comparative rules can be an iterative process that continues until the computing system converges on coefficients for all of the comparative rules. When the computing system compares two rule-comparable prices where some different rules are reverse engineered, the computing system has to factor in the reverse engineered coefficients. For example, if rule A says price P is 1.2 times price Q and the computing system is measuring for rule B, then the computing system will have to compare the prices P/1.2 and Q. Additionally, the computing system may apply rule B in comparing price P and price Q.

After selecting a comparative business rule to reverse engineer, the computing system can generate rule parameters or coefficients (504) for the comparative rule. The method the computing system uses to generate the rule parameters depends on the type of comparative rule, i.e., measured or named. The methods for generating the rule parameters for the different rule types are described in detail below. After generating the rule parameters for the selected comparative rule, the computing system can check if there are more comparative rules to reverse engineer (506). If so, the computing system can repeat the reverse engineering process by returning to step 510. Once the computing system determines that all comparative rules have been reverse engineered, the computing system checks if the results are sufficiently stable (508). In some embodiments, the computing system can determine stability by repeating the analysis with new information. Alternatively, the computing system can base stability on a statistical confidence measurement. If the computing system determines the rules are not stable, the computing system can repeat the reverse engineering process by returning to step 502, otherwise the computing system can resume previous processing, which can include resuming processing at step 308 of method 300 in FIG. 3.

A measured comparative rule describes price tracking over a dimension. For example, a dimension can be encouraging a shopper to buy a larger package. The incentive, or rule parameter, can be measured as an exponent γ, such that X-times the size yields $X^\gamma$ the price. For example, a ten-ounce (10 oz.) box of Tasty Flakes is $1.89, the twenty-ounce (20 oz.) box is $2.99, and the forty-ounce (40 oz.) box is $4.89. Each factor of two in size is 1.6 times the price, $2^{0.68}=1.6$, so γ=0.68. This indicates that the thirty-ounce (30 oz.) box of Tasty Flakes should be $3.99, where the choice of $3.99 over a price like $3.972893 is made in deference to ending-number, price-point rules. In general, $$\gamma = \frac{\log P_a - \log P_b}{\log S_a - \log S_b}$$

where $P_a$ and $P_b$ are the two prices and $S_a$ and $S_b$ are the two sizes.

For each network and each pair of rule-comparable prices within the network, the computing system can calculate the γ values based on size and price ratios, and accumulate the totals weighted by the product of the revenues. After computing the total for each individual network, the computing system can sum the values for the networks to generate a total network γ. In some cases, a user specified parameter for each network can indicate how heavily to weight the overall, all-network γ values and the individual network γ values.

Additionally, the computing system can fit an affine function to the prices and measure a statistical fit. In this case, P=mX+b, where P is the price and X is the product dimension. This computation can be more applicable than the exponent incentive γ for measures not directly denoting quantity, such as pipe diameter, bolt size, or cable length.

To generate the rule parameters for named comparative rules, the computing system can use a least-squared-error fit with a single constraint and add a Lagrange multiplier to the least-squared-error equations.

The computing system collects all of the ratios of rule-comparable prices and weights them by the product of their revenues. The computing system can compare two products in the same network when all of the other comparative rules are either the same or already known from previous analysis.

Let $a_{ij}$ be the weighted observed price ratios and let $w_{ij}$ be the total of the weights, where i and j are rule choices (e.g., brands) where the brands go from 1 to n. Then $p_i$ is selected to minimize the squared differences to minimize $$f(p) = \sum_{i=1}^{n} \sum_{j=1}^{n} w_{ij}(p_i - a_{ij}p_j)^2$$

subject to a scale constraint $$g(p) = \sum_{i=1}^{n} v_i p_i - K = 0$$

where $w_{ii}=0$. Without the scale constraint, the optimal solution is to set all of the $p_i$ to zero. To get an average value of 1.0, set K=n.

Then a Lagrange multiplier λ can be used as an (n+1) term to minimize $$F(P,\lambda) = f(p) + \lambda g(p) = \sum_{i=1}^{n}\sum_{j=1}^{n} w_{ij}(p_i - a_{ij}p_j)^2 + \lambda\left(\sum_{i=1}^{n} v_i p_i - K\right)$$

where (n+1)-vector P is the n-vector p with an extra term for λ.

The solution for the $p_i$ values is the solution of MP=B, where P and B are vectors and M is a square matrix, all in (n+1)-dimensional space.

For the matrix, $$M_{kk} = 2\sum_{j=1}^{n} w_{kj} + 2\sum_{i=1}^{n} w_{ik}a_{ik}^2 \text{ for } k \leq n$$

$$M_{km} = M_{mk} = -2w_{km}a_{km} - 2w_{mk}a_{mk} \text{ for } k, m \leq n$$

$$M_{k(n+1)} = M_{(n+1)k} = v_k \text{ for } k \leq n$$

$$M_{(n+1)(n+1)} = 0$$

For the right hand side, $B_k=0$ for $k \leq n$ $B_{(n+1)}=K$

The solution to these equations can yield values so that the target ratio between brand prices i and j in the same network is $P_i/P_j$.

The present technology can take the form of hardware, software or both hardware and software elements. In some implementations, the technology can be implemented in software, which includes but is not limited to firmware, resident software, microcode, a Field Programmable Gate Array (FPGA), graphics processing unit (GPU), or Application-Specific Integrated Circuit (ASIC). In particular, for real-time or near real-time use, an FPGA or GPU implementation would be desirable.

Furthermore, portions of the present technology can take the form of a computer program product comprising program modules accessible from computer-usable or computer-readable medium storing program code for use by or in connection with one or more computers, processors, or instruction execution system. For the purposes of this description, a computer-usable or computer readable medium can be any apparatus that can contain, store, communicate, propagate, or transport the program for use by or in connection with the instruction execution system, apparatus, or device. The medium can be non-transitory (e.g., an electronic, magnetic, optical, electromagnetic, infrared, or semiconductor system (or apparatus or device)) or transitory (e.g., a propagation medium). Examples of a non-transitory computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. Both processors and program code for implementing each as aspect of the technology can be centralized or distributed (or a combination thereof) as known to those skilled in the art.

The various embodiments described above are provided by way of illustration only and should not be construed to limit the scope of the disclosure. Examples within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection can be properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other examples of the disclosure may be practiced in network computing environments with many types of computer system configurations, including personal computers, handheld devices, multi-processor systems, microprocessor-based or programmable consumer electronics, network PCs, minicomputers, mainframe computers, and the like. Examples may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply not only to a smartphone device but to other devices capable of receiving communications such as a laptop computer. Those skilled in the art will readily recognize various modifications and changes that may be made to the principles described herein without following the example embodiments and applications illustrated and described herein, and without departing from the scope of the disclosure.

What is claimed is:

1. A computer-implemented method comprising:
    obtaining existing price information for a plurality of products;
    calculating, via a processor, target prices based at least in part on the existing price information;
    reverse engineering a set of bounded business rules to generate price bounds for each rule in the set of bounded business rules, wherein the reverse engineering is based at least in part on the calculated target prices;
    reverse engineering a set of comparative business rules to generate rule parameters for each rule in the set of comparative business rules, wherein the reverse engineering is based at least in part on the existing price information; and
    generating at least one recommended price for at least one of the plurality of products by applying the price bounds and the rule parameters to the existing price information.

2. The computer-implemented method of claim 1, wherein reverse engineering a set of bounded rules comprises:
    for each bounded rule in the set of bounded business rules generating an upper bound value $R_{max}$, a lower bound value $R_{min}$, and a target value $R_{target}$.

3. The computer-implemented method of claim 2, wherein the bounded rule is a competitive bounded rule, and wherein
    $R_{max}=(\mu+\sigma)(1+f)$,
    $R_{min}=(\mu-\sigma)(1-f)$, and
    $R_{target}=\mu$, and wherein $\mu$ is a mean, $\sigma$ is a standard deviation, and f is a small factor.

4. The computer-implemented method of claim 2, wherein the bounded rule is a margin bounded rule, and wherein
    $R_{max}=(\mu+\sigma)(1+f)$,
    $R_{min}=(\mu-\sigma)(1-f)$, and
    $R_{target}=\mu$, where $\mu$ is a margin $=(P-C)/P$, and wherein P is the price, C is the cost, f is a small factor, and $R_{max}$ and $R_{min}$ are bounds on the margin.

5. The computer-implemented method of claim 2, wherein the bounded rule is a step-size bounded rule, and wherein
$R_{max}$ is C=c+f, wherein C is the maximum price change factor, c is the 90th percentile of a change ratio, and f is a small forgiveness factor,
$R_{min}$ is B=b−f, wherein B is the minimum price change factor, b is the 10th percentile of the change ratio, and f is a small forgiveness factor, and
$R_{target}$, is current price.

6. The computer-implemented method of claim 2, wherein the bounded rule is a general bounded rule, and wherein
$R_{max}$=R(1+μ+σ+f),
$R_{min}$=R(1+μ−σ−f), and
$R_{target}$=1+μ, and wherein P is current prices, R is reference prices, μ is a mean, σ is a standard deviation, and f is a forgiveness factor.

7. The computer-implemented method of claim 2, wherein the bounded rule is a margin bounded rule, and wherein
$R_{max}$=C/(1−v), where v=(μ+σ)(1+f),
$R_{min}$=C/(1−v), where v=(μ−σ)(1−f), and
$R_{target}$=μ, where μ is a price, v is a bound of margin =(P−C)/P, and wherein P is the price, C is the cost, f is a small factor, and $R_{max}$ and $R_{min}$ are bounds on the price.

8. The computer-implemented method of claim 1, wherein reverse engineering a set of comparative rules comprises:
iteratively generating rule parameters for each comparative rule in the set of comparative rules until the rule parameters are stable.

9. The computer-implemented method of claim 8, wherein iteratively generating the rule parameters comprises:
performing a number of rounds, the number of rounds determined dynamically based on stability of the rule parameters, each round comprising:
for each comparative rule in the set of comparative rules, generating rule parameters for the comparative rule, and
determining whether the rule parameters are stable.

10. The computer-implemented method of claim 8, wherein the comparative rule is a measured comparative rule, and wherein generating the rule parameters comprises:

$$\text{calculating } \gamma = \frac{\log P_a - \log P_b}{\log S_a - \log S_b}$$

wherein, $P_a$ and $P_b$ are the two prices and $S_a$ and $S_b$ are the two sizes.

11. The computer-implemented method of claim 8, wherein the comparative rule is a named rule, and wherein generating the rule parameters comprises:
using a least-squared-error fit with a single constraint; and
adding a Lagrange multiplier to the least-squared-error equations.

12. A manufacture comprising:
a non-transitory computer-readable storage medium; and
a computer executable instruction stored on the non-transitory computer-readable storage medium which, when executed by a computer device, causes the computing device to perform a method comprising:
calculating target prices based at least in part on existing price information of a plurality of products,
generating price bounds for a set of bounded business rules based at least in part on the calculated target prices,
generating rule parameters for a set of comparative business rules based at least in part on the existing price information, and
generating at least one recommended price for at least one of the plurality of products by applying the price bounds and the rule parameters to the existing price information.

13. The manufacture of claim 12, wherein generating price bounds comprises:
for each bounded rule in the set of bounded business rules generating an upper bound value $R_{max}$, a lower bound value $R_{min}$, and a target value $R_{target}$.

14. The manufacture of claim 12, wherein generating rule parameters comprises:
iteratively generating rule parameters for each comparative rule in the set of comparative rules until the rule parameters are stable, wherein iteratively generating the rule parameters comprises:
performing a number of rounds, the number of rounds determined dynamically based on stability of the rule parameters, each round comprising:
for each comparative rule in the set of comparative rules, generating rule parameters for the comparative rule, and
determining whether the rule parameters are stable.

15. The manufacture of claim 12, wherein the price information comprises at least one of product attributes, competitive prices, reference prices, or current prices.

16. The manufacture of claim 12 further comprising:
generating recommended prices based at least in part on at least one of the generated price bounds or the generated rule parameters.

17. A system comprising:
a processor;
a computer readable storage medium storing instructions for controlling the processor to perform steps comprising:
calculating target prices based at least in part on existing price information of a plurality of products,
generating price bounds for a set of bounded business rules based at least in part on the calculated target prices, wherein the price bounds include at least one of an upper bound value $R_{max}$, a lower bound value $R_{min}$, or a target value $R_{target}$,
generating rule parameters for a set of comparative business rules based at least in part on the existing price information, wherein generating rule parameters comprises:
iteratively generating rule parameters for each comparative rule in the set of comparative rules until the rule parameters are stable; and
generating at least one recommended price for at least one of the plurality of products by applying the price bounds and the rule parameters to the existing price information.

18. The system of claim 17, wherein iteratively generating the rule parameters comprises:
performing a number of rounds, the number of rounds determined dynamically based on stability of the rule parameters, each round comprising:

for each comparative rule in the set of comparative rules, generating rule parameters for the comparative rule, and determining whether the rule parameters are stable.

19. The system of claim 17, wherein the set of bounded business rules includes at least one of a competitive bounded rule, a margin bounded rule, a step-size bounded rule, or a general bounded rule.

20. The system of claim 17, wherein the set of comparative business rules includes at least one of a measured comparative rule or a named comparative rule.

* * * * *